United States Patent [19]

Clapp

[11] Patent Number: 5,010,414
[45] Date of Patent: Apr. 23, 1991

[54] PROCESS ELIMINATING THE USE OF A MASTER POSITIVE FILM FOR MAKING A DUPLICATE NEGATIVE OF A COLOR MOTION PICTURE

[76] Inventor: Roy A. Clapp, 2505 S. Kiwanis Ave., Sioux Falls, S. Dak. 57105

[21] Appl. No.: 802,511

[22] Filed: Nov. 27, 1985

[51] Int. Cl.⁵ .................... H04N 5/87; H04N 5/253
[52] U.S. Cl. .................... 358/244; 358/244.2; 358/332; 358/80; 360/3; 352/45; 352/46
[58] Field of Search ............ 358/244, 244.1, 244.2, 358/902, 332, 78, 80; 360/3; 352/45, 46

[56] References Cited

U.S. PATENT DOCUMENTS

| | | | |
|---|---|---|---|
| 3,741,651 | 6/1973 | Nishiyama et al. | 358/244 X |
| 3,824,336 | 7/1974 | Gould et al. | 360/3 X |
| 4,305,095 | 12/1981 | Dallas | 352/45 X |
| 4,467,369 | 8/1984 | Alston | 358/332 |
| 4,473,849 | 9/1984 | Cool | 358/332 |
| 4,488,244 | 12/1984 | Freeman | 358/244 X |
| 4,492,987 | 1/1985 | Burkardt et al. | 358/332 |
| 4,520,403 | 5/1985 | Burkhardt et al. | 358/332 |
| 4,575,766 | 3/1986 | Birnbaum et al. | 358/244 |
| 4,627,004 | 12/1986 | Cool et al. | 358/244 X |
| 4,660,098 | 4/1987 | Wolcott | 358/244 X |
| 4,688,104 | 8/1987 | Wolcott | 358/244 X |
| 4,694,356 | 9/1987 | Constable | 358/244 X |

*Primary Examiner*—Alan Faber
*Assistant Examiner*—W. R. Young

[57] ABSTRACT

Process for making an improved duplicate negative from an original color motion picture negative by using optical color filters with flying spot scanning of the original negative to generate tri-color separation analog video signals. These signals are transmitted through active and/or passive electronic filters, at which stage the signals may be optionally modified. The signals are used to create images on a black and white cathode ray tube. A lens projects these images through optical color filters to create a latent image in each of the three emulsion layers of a color sensitive motion picture film. This process is repeated for each frame of the original negative, after which the exposed film is developed in the conventional way, resulting in a duplicate negative, suitable for use for release printing.

7 Claims, 2 Drawing Sheets

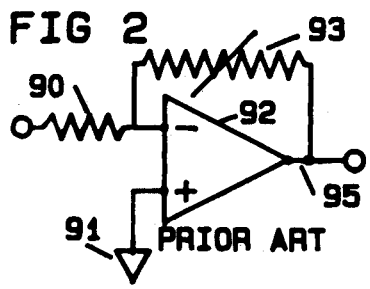
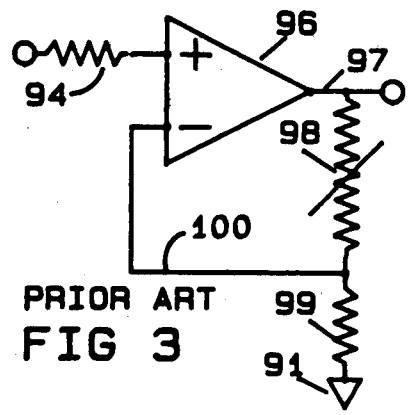
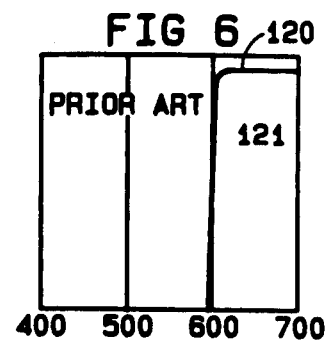
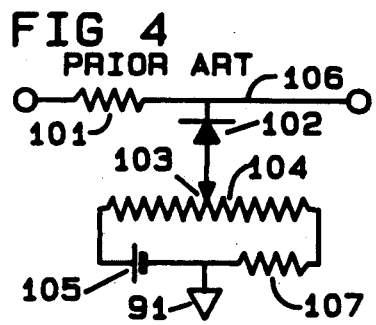
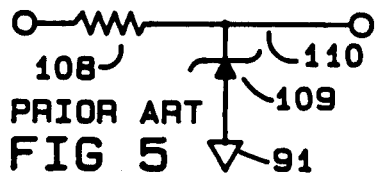
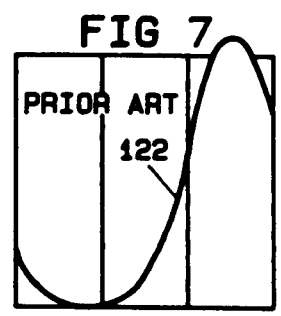
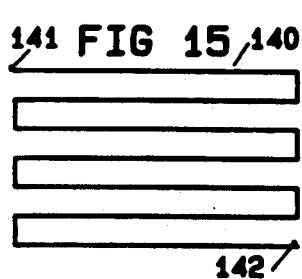
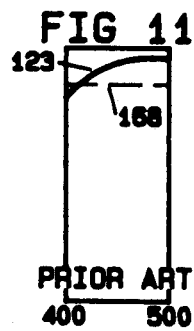
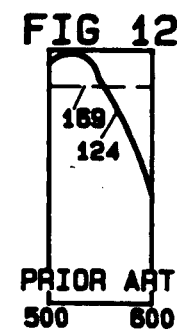
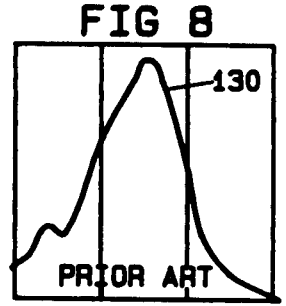
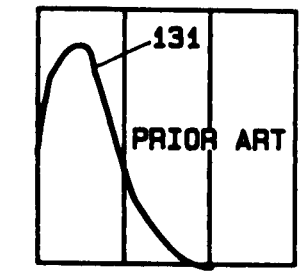
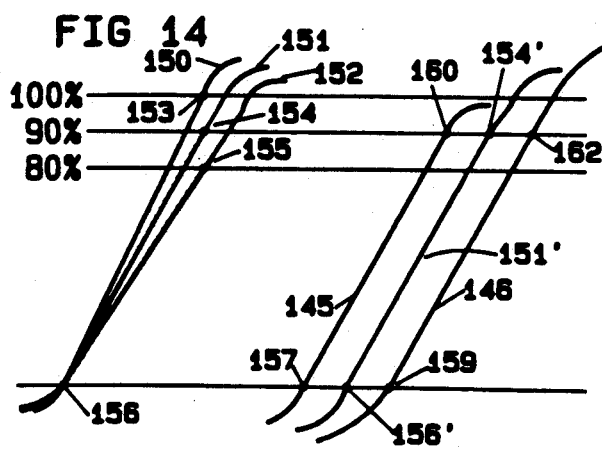
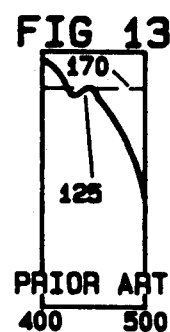
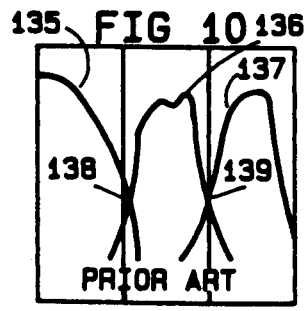

PROCESS ELIMINATING THE USE OF A MASTER POSITIVE FILM FOR MAKING A DUPLICATE NEGATIVE OF A COLOR MOTION PICTURE

BACKGROUND OF THIS INVENTION

This invention has numerous applications to the production of motion pictures.

This invention eliminates the need of making an intermediate photographic color master, thereby saving the cost of material and labor.

This invention provides an improved quality of duplicate negative, by eliminating the color distortions incident to using a photographic master positive as an intermediate step in making a duplicate color negative.

This invention permits a considerable degree of compensation for the quality losses inherent with the initial negative and the final color material.

It provides some degree of remedy for losses due to incorrect exposure of any original negative.

It further permits for post-production changes of color reproduction for artistic reasons.

In the past, as a safety measure with black and white movies, it was standard practice to make a master print, called a lavender, from the finished original edited negative, and then to make a "dupe" negative from this lavender. The original could then be preserved in a vault, while the release prints were made from this dupe.

Unlike the silver images of black and white film, the images of the color film are formed of dyes. All known dyes are imperfect for this purpose. So making duplicate color negatives in a comparable way, results in a serious quality loss.

The usefulness of this invention extends beyond simply making duplicate negatives. It provides valuable means for the production of superior, post-production opticals, and special effects.

BRIEF DESCRIPTION OF DRAWINGS

FIG. 2 is a circuit diagram of an inverting amplifier representing an example of prior art.

FIG. 3 is a circuit diagram on a non-inverting amplifier representing an example of prior art.

FIG. 4 is a diagram of a energy modifying circuit representing an example of prior art.

FIG. 5 is a diagram of a volume limiting circuit representing an example of prior art.

FIG. 6 is a graph of an, ideal cyan dye in, a desirable characteristic, not available in present art.

FIG. 7 is a graph of a typical cyan dye characteristic of present art.

FIG. 8 is a graph of a typical magenta dye characteristic of present art,

FIG. 9 is a graph of a typical yellow dye characteristic of present art.

FIG. 10 is a graph of the spectral sensitivities of the three emulsion layers of a colorfilm characteristic of present art.

FIG. 11 is a graph of the effect of the cyan dye upon the blue spectrum band signal characteristic of present art.

FIG. 12 is a graph of the effect of the cyan dye upon the green spectrum band signal descriptive of characteristic imperfection of presently available materials.

FIG. 13 is a graph of the effect of the magenta dye upon the blue spectrum band signal descriptive of characteristic imperfection of presently available materials.

FIG. 14 illustrates the disparate characteristic curves of a processed film, and the improvement of same, by means of this invention descriptive of characteristic imperfection of presently available materials.

FIG. 15 is a raster pattern used in this process.

SOME LIMITATIONS OF COLOR PHOTOGRAPHY

Figure 1:
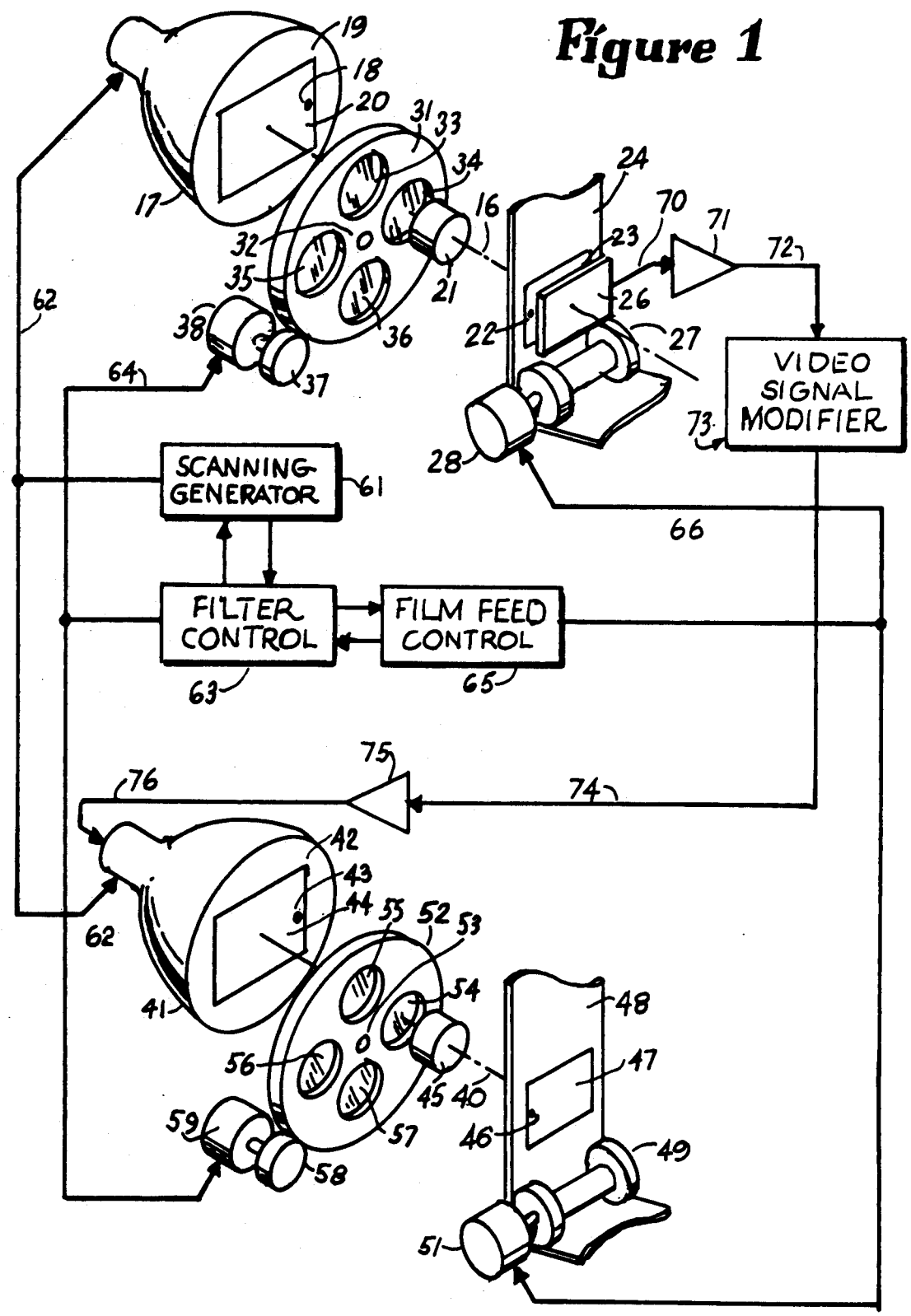
FIG. 1 is a schematic illustration of suitable apparatus adapted to perform this process.

It will be helpful to the understanding of this invention, to review some basic facts relating to color photography, and to define certain terms used herein.

The visible portion of the electro-magnetic spectrum is roughly limited to energy between the wavelengths of 400 to 700 nanometers. If this spectrum is divided into three equal bands, we perceive a different color for each band. The blue band is the region between 400 to 500, the green band is between 500 and 600, while the red band encompasses energy between 600 and 700. These colors are called the additive primaries, since they form the complete white light spectrum when added together.

Other basic colors are formed when one of the additive primaries are removed from the full white light spectrum. These we can call the subtractive primaries. Any pair of additive and subtractive primaries which, when combined, form white light, are mutual complements.

Color motion picture film has three emulsion layers, each intended to respond exclusively to exposure to one of the additive primaries, to produce images in their respective subtractive compliments.

This intent is not perfectly realized with present materials, as can be seen in FIG. 10. The spectral sensitivity of the three layers are plotted in this graph. Curve 135 indicates the sensitivity of the blue layer, 136 the green layer, and 137 the red layer. It will be noted that there is a region of overlap between adjacent graphs, as indicated at 138 and 139. This indicates that each emulsion layer has a slight response to colored light which it should be blind to.

Another problem arises because the three layers must be processed for the same time duration. Upon immersion, the top layer immediately contacts the developing solution, while the lower layers do not receive the solution until it permeates the preceding layers. Thus, action does not start simultaneously. Further, the solution reaching the lower layers has been modified by the work it did upon the preceding layers. Hence, while efforts to compensate are made in the manufacture, in actual practice, this results in small differences in the gamma of each layer, as shown in the characteristic curves in the left side of FIG. 14. It will be noted that the straight line portion of each curve has a different slope. These are drawn with their point of coincidence at 156. Thus, if this density yielded a neutral gray in the print, any picture area having a higher density, would not be neutral, because the curves diverge as the density increases. Later reference to the other curves, at the right of this Figure, will show how this invention can correct this.

The major loss, is caused by the imperfections of the dyes themselves. These dyes do not absorb all of the light within the band they are supposed to, and they absorb within the color bands they are supposed to pass completely. This density in the complementary bands cause a neutral density loss for the said bands. This is shown by the density data plots. FIG. 6 illustrates the ideal cyan dye, which would be the perfect compliment of red light band passed by a Wratten #29 filter. The area 121 under the curve 120 should be totally opaque, while the rest of the spectrum, outside of said area, should be totally free of absorption. FIG. 7 shows the actual density curve for a typical cyan layer. In like manner, in FIGS. 8 and 9, curves 130 and 131 show the density of the magenta, and yellow dye layers respectively.

Making and using a duplicate negative in the common way, there are four separate films involved, the original negative, the photographic intermediate, the final duplicate negative, and the final film of the release print. Thus these dye deficiencies accumulate.

Masking of the emulsions of the three films involved in the duplicating process, reduces the dye losses considerably, but this technique cannot be employed in the final projection print for obvious reasons.

DISCUSSION OF THE PREFERRED EMBODIMENT OF THIS INVENTION

A great improvement in the quality of a duplicate negative can be realized by simply substituting a positive image produced by an electronic signal, in place of a photographic intermediate print. This eliminates the effect of the dye deficiencies of the intermediate master.

But this is not the limit of the advantages made possible by this invention. Intermediate modification of the electronic signal, between its creation and its display on a CRT, allows for reducing the effect of the dye deficiencies, correcting the gamma of the individual layers, and/or introducing desired color balance and contrast changes.

The preferred way to transfer the information from the original negative to the final sensitized film stock, is to separately record the data from the individual dye layers, to create separate electronic signals for the red, the green and the blue data, and the to transfer this separated data to the corresponding layers of the final sensitized film.

Suitable apparatus is next described to permit carrying out the process. With the single exception of a simpler and more efficient raster pattern, it should be emphasized that no novelty is claimed, nor is this apparatus a direct part of this invention. The sole reason for inclusion, is to aid in the understanding of this process.

SUITABLE APPARATUS

FIG. 1 illustrates in schematic form, suitable apparatus to carry out this invention. Signal generating means is provided by the following described assembly.

Arranged along a common optical axis, is a cathode ray tube, commonly designated as a CRT, a color filter, 34, mounted in an opening of a color wheel, 31, a lens, arranged to focus the plane of the CRT screen upon the film, 24, supported by usual means (not shown).

A flying spot is generated by the cathode ray tube, 17, displaying a raster pattern, 20, on its fluorescent screen, 19. The light from the luminous spot, 18, after passing through a color filter, 34, is projected by the lens, 21, to form an image, 22, on the original negative film, 24. It being understood that the luminous spot is traveling over the unique raster pattern, illustrated in FIG. 15. It covers a rectangular area of suitable dimension to cover the full frame of the film, 24. Beyond the image frame, 23, and on the same optical axis, is a photo sensor, 26.

The output of this photo sensor varies in accordance with the intensity of the light passing through the different densities along points of the image, 23, of the original negative, to constitute an analog electronic signal, for the data recorded on one layer of the original negative. The particular layer, being determined by which color filter is inserted in the optical axis.

This electronic signal is fed to a preamp, 71, by the connecting cable, 70. The amplified signal is then fed to a video signal modifier unit, 73, through the connection 72. This unit, containing various components, which will be described later, permits altering the electronic signal in various desirable ways, to carry out the purposes of this invention.

Following this, the modified signal is transmitted by the bus, 74, to the amplifier, 75, which raises the signal energy to control the illumination of the flying spot, 43, on the face, 42, of the CRT, 41.

Because the electronic signal is modified, as mentioned, the use of a raster generated in the conventional way, requiring blanking signals to be integrated with the video signals is totally unsuited for use in this process. Whatever modification was applied to the video signal, would be also applied to the blanking signal, thereby destroying its function.

This problem is solved by the novel pattern illustrated in FIG. 15, which needs no signal blanking.

Both flying spots, 18 and 43, move over identical paths in perfect synchronism, because the same scanning generator, 61, supplies both CRT 17 and CRT 41. This signal is carried by a common bus, 62, and consists of both vertical and horizontal scanning voltages, serving to generate the raster pattern.

Referring to FIG. 15, at a given instant of time, the flying spot, 141, is at the upper left corner of the screen, it travels horizontally to the right, parallel to the top of the screen, along path 140. When it reaches the right side of the raster pattern, it drops vertically, a distance somewhat less than the diameter of the luminous spot, and moves in a reverse direction, parallel to its previous travel path. It continues thus to move back and forth horizontally, dropping at each end of travel, until it arrives at the end of the raster pattern, 142. Whereupon, without stopping the alternate horizontal movement, the direction of the vertical movement is reversed, and the spot moves upward at each end of its side to side movement, exactly retracing its movement in forming the first complete scan cycle.

It will be seen that this requires no blanking periods during the scan cycle, and is therefore more efficient than the type of raster used in commercial TV. Unlike commercial TV, with this process, there is no need for interlaced scanning, since persistence of vision plays no part in recording on film.

Having no need for blanking signals, this pattern is also simpler to produce. The horizontal sweep requires only a triangular voltage signal, which is continuously repeated, whether the trace is proceeding down or up. The vertical movement is produced by short, stair step pulses, which reverse polarity, whenever either the beginning or end of the raster is reached.

Suitable resolution for this process, is secured by employing a higher number of lines than used by commercial TV. Also, the scanning speed can be reduced, if desired. Since the process is automatically cycled, and the equipment does not require operator attendance while functioning, cycle speed is not of primary importance.

The writing assembly is generally identical to the signal generating unit described above. Arranged on the common optical axis, 40, is the CRT, 41, the filter, 54, having the same color as the corresponding filter, 34, of the signal generating unit, the lens, 45, and the unexposed film, 48. The area, 47, is the conjugate image of the raster pattern, 44, reduced in size to fill a single motion picture frame.

The flying spot, 43, with its image, 46, focused upon the film, is modulated in intensity by the level of the electronic signal, as it follows the changing density of the points scanned on the original negative.

In order to automate the process, the filter wheels, 31 and 52, are provided with stepper motors, 38 and 59, acting through driving elements, 37 and 58, serving to rotate these wheels in synchronism through a 90 degree angle. And film drive means, actuated by the stepper motors, 28 and 51, connected to film sprockets, 27 and 49, advance the two films after each frame has been sequentially scanned, with at least three of the color filters.

The filter wheels are rotationally mounted on a central bearings, 32 and 53, allowing the filters mounted therein, to be selectively inserted and removed from path of the light. The filters, 34 and 54, are red transmitting, the filters, 33 and 55, are green transmitting, and the filters, 35 and 56, are blue transmitting. A fourth opening in each wheel, contains neutral density filters, 36 and 57. These are sometime used for special purposes, but are normally programmed to be bypassed during the standard operating cycle.

A filter control unit, 63, and film feed control, 65, are provided and programmed to interact with each other, to go through an automatic cycle, as follows:

With the two films loaded, the first frame is scanned and projected, according to prior explanation, using the red filters. Then the filter wheels rotate, placing the green filters in place, and the scanning and projection is repeated. This action is repeated a third time, using the blue filters. This completes the information transfer of the first frame. Whereupon, the films are advanced to the next frame, while the filter wheels rotate 180 degrees, to bring the red filters again into position, and the same process repeated. This cycle is repeated until the entire original film is duplicated.

The electronic signal may take any one of several forms. It may be positive going, or negative going, or alternating each side of a neutral base line. It may be linear or non-linear, logarithmic, for example. However, for the sake of simplicity, the signal will be considered as positive going, with the amplitude proportional to the light transmitted through points along the scanning path of the flying spot, 22, as produced by a linear response photo sensor, 26, located beyond the frame, 23.

This process contemplates a positive image being displayed on the CRT. It may be helpful to explain the nature of the electronic signal, starting with the subject of the original negative, and proceeding through to the release print.

The action of light areas of the original subject, imaged on the original film, produce a dense area of complementary colored dye. Conversely, dark areas of the subject produce reduced action on the sensitive film, resulting in areas of lower negative density. Thus the film negative is both tonally and color reversed from the subject, since the original subject colors are now represented by their complements.

Since more light passes through the low density areas of the negative, the signal from the photo sensor is higher for the areas corresponding to the dark areas of the original subject.

The control grid of the CRT reduces the image intensity with a high signal. Therefore, the high signal of the photo sensor, corresponding to the dark areas of the original subject, produces a dark area in the picture on the screen of the CRT. Consequently, the picture is a positive, as required. A negative image is produced in the film viewing this picture. And, finally, the print from this negative provides the final reversal to make the print resemble the original subject. The important point of this is to demonstrate that the signal generated by the photo sensor is properly polarized for this process.

But, the signal effect upon the CRT control grid is not linear, so that compensation must be provided. In the explanation which follows, it will be assumed this is provided in the driver stage, by the amplifier, 75.

There are a variety of known circuits which are suitable for modifying the electronic signal in the desired manner. Several examples are illustrated, using standard component symbols, in FIGS. 2, 3, 4, and 5. These, or suitable alternates, make up the video signal modifier, 73, shown in FIG. 1.

FIG. 2 is a diagram of an inverting, variable gain amplifier, in which the signal is input through resistor, 60, to the negative terminal of an operational amplifier, 92. The positive input terminal being connected to a ground terminal, 91. A variable resistor, 93, is connected between the output terminal bus, 95, and the negative input terminal. A possible use for an inverting amplifier, is to first invert, then modify, and finally, invert a second time. Modifying an inverted signal has a reverse effect, from that of acting upon the original signal. An additional application for the inverting amplifier is to permit making a duplicate negative from a positive film.

FIG. 3 is a diagram of a non-inverting, variable gain amplifier. In which the input signal is applied through the resistor, 94, to the positive terminal of the operational amplifier, 96. The variable resistor, 98, is connected at its upper end to the output bus, 97, and its lower end to a fixed resistor, 99, which, in turn is connected to a ground terminal, 91. A conductor, 100, connects the negative input terminal to the junction between the resistors, 98 and 99.

FIG. 4 diagrams a circuit suitable for adding a controlled amount of energy, to the electronic signal. This energy is provided by the power supply, 105. The signal inputs through the resistor, 101, to the output bus, 106. The negative terminal of the power supply is connected to the ground terminal, 91, the positive terminal of said power supply is connected to one end of the potentiometer, 104. The other end of the potentiometer is connected to the ground terminal, 91. A sliding contact, 103, controls the amount of potential applied to the output bus, 106, through a diode, 102.

FIG. 5 illustrates a clipping circuit with the input resistor, 108, through which the signal flows to the output bus, 110. This circuit limits the output level to a predetermined maximum amplitude, and/or serves to cut off signal peaks that rise above this maximum, as determined by the zener diode, 109, interposed between the ground terminal, 91, and the output bus, 110.

METHOD OF USE

Returning to FIG. 14, and three curves at the left side of this Figure, it will now be explained how the straight line portions of these curves may be made to coincide, by means of this invention. The separate curves, 150, 151, and 152, each corresponds to one of the emulsion layers of a processed film. The identity of the color layers cannot be generally predetermined, except for a given film. So that for this example, curve, 150, will be designated as corresponding to a layer x, the curve, 151, to the y layer, and the curve, 152, to the z layer.

The slope of these curves define the different gamma of the respective layers. If a dot is placed on the steepest curve at the upper limit of the straight line portion, as at 153, and this density be assigned the arbitrary value of 100%, then if similar dots be placed directly below this, on the other curves, the problem of equalizing the gamma of the three layers, merely becomes one of altering the slopes to cause the three dots to be superimposed.

This can be easily performed by varying the amplification of the individual signals. By taking the height of the dot on curve 151, as a aim point, we need only reduce the amplification of the signal for layer x, to 90% of its original value. This results in the curve with the slope of its straight line portion, 145, as shown in the first modified plot of the curve to the right of the previously mentioned group. The dot, 153, has now been lowered to the location at point, 160. If likewise, the signal for layer z, is amplified from a level of 80% to 90%, the location of the original dot, 155, is now located at the level of dot 162 on new curve having the straight line portion, 146. Thus it will be seen that if the three curves are returned to their original position, with points, 157 and 159, in coincidence with point 156' on the unaltered curve for layer x, they would all match. Thus, if a picture area of low density about point 156' appeared as a neutral gray, another area at any higher density, would also remain the same neutral gray.

By testing the new film stock to be used for the duplicate negative, and also the characteristic curves of the processed original negative, this invention make it possible to combine the correction for both, and produce a duplicate negative with a uniform gamma for all three layers.

IMPROVING COLOR SATURATION

It has been noted that the available dyes, useful for color photography, have less than full absorption in the band they occupy, and more importantly, there is serious absorption in the complementary bands. This is illustrated by FIG. 7, in conjunction with FIGS. 11 and 12. Referring to FIG. 7, the characteristics of the cyan dye, formed in the layer sensitized to red. Curve 122, extends into the complementary bands of blue and green.

As a result, the signals for these bands are shown in FIGS. 11 and 12. Because the sensitivity of color emulsion layers peak within their bands, the combination of the unwanted dye in the complimentary bands have a average value, represented by the dotted lines, 168 and 169. This indicates that when a picture area has a maximum area of cyan density in the original negative, the signal level of the complementary band are reduced to a level indicated by the dotted lines. Correction may be made by increasing the blue and green signal levels for that particular picture area, to restore them to the full amplitude. That is, there should be full signal transmission of these bands, to obtain a full saturation in a print.

FIG. 8, in conjunction with FIG. 13, shows the reduced energy for the blue band, when the magenta dye layer is exposed.

The foregoing is the degree of false rendering with color film, when the emulsion is not masked. By incorporating masking in the different layers of the negative, this neutral density effect of the absorption in the complimentary bands, is greatly reduced. The magnitude of corrections introduced by this process are reduced accordingly, to complete any residual.

And, of course, masking cannot be used in the final print stock. But the effect of the above described distortions can be anticipated, and some corrective measures taken in the duplicate negative to cancel out the degradation of the final print.

It will be noticed that no reference is made throughout this specification, for correction relating to the yellow dye, which formed in the blue sensitive emulsion layer. This is because this dye corresponds more nearly to a theoretical ideal, than the others. Consequently, there is no practical advantage in compensating for the small signal losses involved.

While certain general rules have been given, because of the complex and variable nature of the numerous factors involved, the practical approach to establishing the amount of corrective modification of the electronic signal, must be empirical, based upon preliminary testing.

However, from the data presented in FIGS. 7 through 13, inclusive, the general nature of correction is clear. We have seen that with the cyan and magenta dyes, (FIGS. 7 and 8) there is a substantial absorption in the other, complementary bands. This has the practical effect of adding a certain amount of black to the image. This lowers the color saturation over what would be produced if theoretical perfect dyes were available.

There are at least two different approaches in the way this invention may be applied, and the method used to determine the degree of signal modification to be employed.

The neutral density component of a dye, appears to be a constant percent of that particular dye density. Consequently, if the signals are recorded, and their individual amplitudes evalued by a computer, the correct amount of correction for each point of the image can be determined and the signals modified accordingly.

But there is a simpler method, based upon the concept that we only want to improve the quality of final print. An aim point can be arrived at by testing. It is based upon determining the average integrated density of a satisfactory print.

We know of course, that various areas have higher or lower densities than this mid point, and that their colors also vary. We also know that the neutral densities of the dyes have a certain percentage value, which we will simplify by calling this 10%. If we now elect to set up a ratio of, say, 5% correction for the mid point, we will fully correct for a certain lighter density area, and improve all densities above this value. True, the very light densities will be now over corrected, but before they were under corrected, so they are not seriously damaged.

Another way of explaining this approach, is to recognize that correction of dye deficiencies, consists of overcoming the neutral density components, by inserting energy, making the colors brighter.

The application of this invention is especially useful for the making of post-production opticals, such as dissolves or other transitions, which are to be cut into the original scenes, by providing a closer match to the original scene.

There is also another application. It sometimes happens that the color quality of the original does not meet the artistic standard, either due to slightly imperfect exposure of the original negative, or because the intended effect was not as desired. Suitable changes for these situations ar easily determined.

The colors can be made more pastel, or somber, or more saturated (brighter), or the color balance altered. The means resemble those of the artist, who can attain those results by mixing black, white or other colors into the paint being applied to the canvas. Adding or removing a predetermined amount of energy to the signals, as described heretofore, will lighten or darken the image in the final print made from the duplicate negative, similar to adding white to a paint, thus producing a to the colors. Saturation can be raised or lowered by increasing or decreasing the amplification of the signals. Color balance will be altered when such modifications are applied unequally to the signals of the different color bands.

But a simple alternate way to lower the saturation of all the colors is provided by the fourth filter insert, the neutral density ones, 36 and 57, seen in FIG. 1. In normal use these are skipped over, but by giving a portion of the exposure through these filters, in addition to reduced tri-chromatic exposures, the color saturation is reduced in accordance with the ratio of color and non-color exposures selected. The purpose of using neutral density filters, instead of clear openings, is simply to make the exposures between the different filters, more equal.

Having described the uses and method of practicing this invention, I claim:

1. The process of making a duplicate color motion picture negative from an original motion picture negative, comprising, an exposure cycle including the steps of generating an analog electrical signal corresponding to a single dye layer of a frame of the original color motion picture negative by projecting one or more scanning cycles of a continuous raster pattern formed upon a first monochromatic cathode ray tube, through a first optical filter restricting the light energy to a predetermined wave length band, focusing said raster pattern on a single frame of the original negative and thence to a photo sensor, supplying said analog signal to a second monochromatic cathode ray tube to simultaneously display a positive image thereon, precise synchronism of the raster patterns insured by providing both cathode ray tubes a common deflection source, and finally projecting the positive image through a second filter adapted to substantially restrict exposure to a single emulsion layer corresponding to the dye layer of the original negative being scanned, and onto a photosensitive surface of an unexposed color motion picture film; changing first and second optical filters and repeating the exposure cycle until the latent images of all duplicate negative emulsion layers are completed for said frame; advancing both negative and photosensitive films one frame and repeating the above process steps until the complete negative is copied; and finally chemically processing the photosensitive film to form a duplicate negative suitable for release printing, wherein the scanning cycles consist of a raster pattern formed by a continuously energized electron beam traversing a path, starting at one corner of the field of the cathode ray tube, proceeds along a path parallel to one edge of the field until it completes its passage to the opposite end of said path, then moves a distance approximately equal to the electron beam diameter at right angles, then proceeds along a path parallel to its previous movement, repeating this pattern until the complete field has been covered, whereupon the beam retraces the foregoing pattern in a reverse direction to return to its starting point.

2. The process of making a duplicate color motion picture negative from an original color motion picture negative, as described in claim 1, wherein said first and second filters constitute pairs, a first pair designed to be used during a first exposure cycle passes light energy limited within a 600 to 750 nanometer spectral region, a second pair used during a second exposure cycle passing light energy limited within 500 and 600 nanometers, a third pair used during a third exposure cycle passing light energy limited within 400 and 500 nanometers, and a fourth pair of optical neutral density filters used optionally during a fourth exposure cycle passing light within 400 to 750 nanometers.

3. The process of making a duplicate color motion picture negative from an original color motion picture negative, as described in claim 1, including applying unaltered analog signals to the second cathode ray tube, to display an unmodified positive image thereon.

4. The process of making a duplicate color motion picture negative from an original color motion picture negative, as described in claim 1, including amplifying one or more of the analog signals before being applied to the second cathode ray tube.

5. The process of making a duplicate color motion picture negative from an original color motion picture negative, as described in claim 1, including non-linearly amplifying said analog signals for the emulsion layers before being applied to the second cathode ray tube.

6. The process of making a duplicate color motion picture negative from an original color motion picture negative, according to claim 1 including optionally employing a different number of scanning cycles for at least one different emulsion layer, serving to correctively alter the latent image density in the corresponding emulsion layer of the sensitized film which will form the duplicate negative.

7. The process of making a duplicate color motion picture negative from an original color motion picture negative, according to claim 1, including adding a small amount of electrical energy into one or more of the analog signals before being applied to the second cathode ray tube, serving to compensate for the loss due to neutral density component of certain dye images.

* * * * *